(12) United States Patent
Sheridan

(10) Patent No.: US 10,533,522 B2
(45) Date of Patent: Jan. 14, 2020

(54) LOAD BALANCED JOURNAL BEARING PIN

(71) Applicant: United Technologies Corporation, Farmington, CT (US)

(72) Inventor: William G. Sheridan, Southington, CT (US)

(73) Assignee: United Technologies Corporation, Farmington, CT (US)

(*) Notice: Subject to any disclaimer, the term of this patent is extended or adjusted under 35 U.S.C. 154(b) by 372 days.

(21) Appl. No.: 15/659,992

(22) Filed: Jul. 26, 2017

(65) Prior Publication Data

US 2017/0356388 A1    Dec. 14, 2017

Related U.S. Application Data

(63) Continuation-in-part of application No. 14/307,587, filed on Jun. 18, 2014, now Pat. No. 9,726,083.

(60) Provisional application No. 61/868,120, filed on Aug. 21, 2013.

(51) Int. Cl.
| | |
|---|---|
| *F02K 3/068* | (2006.01) |
| *F02C 3/073* | (2006.01) |
| *F02C 7/36* | (2006.01) |
| *F16H 1/28* | (2006.01) |

(Continued)

(52) U.S. Cl.
CPC .............. *F02K 3/068* (2013.01); *F02C 3/073* (2013.01); *F02C 7/36* (2013.01); *F16H 1/2836* (2013.01); *F16H 1/48* (2013.01); *F16H 57/0479* (2013.01); *F05D 2220/3217* (2013.01); *F05D 2230/50* (2013.01); *F05D 2240/50* (2013.01); *F05D 2260/40311* (2013.01)

(58) Field of Classification Search
CPC ...... F02C 7/36; F02C 7/04; F16H 1/48; F16H 1/570479; F16H 2057/082; F16H 2057/085; F16H 2057/087; F05D 2260/40311
See application file for complete search history.

(56) References Cited

U.S. PATENT DOCUMENTS

| | | | |
|---|---|---|---|
| 3,303,713 | A | 2/1967 | Hicks |
| 5,102,379 | A | 4/1992 | Pagluica et al. |
| 6,964,155 | B2 | 11/2005 | McCune et al. |

(Continued)

FOREIGN PATENT DOCUMENTS

WO    2005/012761 A1    2/2005

OTHER PUBLICATIONS

International Search Report and Written Opinion for International Application No. PCT/US2014/051830 dated Apr. 29 2015.

(Continued)

*Primary Examiner* — Carlos A Rivera
(74) *Attorney, Agent, or Firm* — Carlson, Gaskey & Olds, P.C.

(57) ABSTRACT

A disclosed fan drive gear system includes a sun gear rotatable about an axis of rotation, a plurality of intermediate gears rotatable about an intermediate gear rotation axis in meshing engagement with the sun gear and a ring gear circumscribing the intermediate gears. A bearing assembly supports at least one of the plurality of intermediate gears and includes a first beam extending in a first direction and a second beam extending from an end of the first beam in a second direction. The bearing surface supported on the second beam such that first and second beams are configured to maintain the bearing surface substantially parallel to the intermediate gear rotation axis during operation.

20 Claims, 4 Drawing Sheets

(51) Int. Cl.
*F16H 1/48* (2006.01)
*F16H 57/04* (2010.01)

(56) References Cited

U.S. PATENT DOCUMENTS

| | | |
|---|---|---|
| 7,056,259 B2 | 6/2006 | Fox |
| 7,297,086 B2 | 11/2007 | Fox |
| 8,020,665 B2 | 9/2011 | Sheridan et al. |
| 8,075,443 B2 | 12/2011 | Cunliffe et al. |
| 8,192,323 B2 | 6/2012 | Fox |
| 8,297,916 B1 | 10/2012 | McCune et al. |
| 8,430,788 B2 | 4/2013 | Fox et al. |
| 2005/0215389 A1 | 9/2005 | Shimizu et al. |
| 2010/0331139 A1 | 12/2010 | McCune |
| 2010/0331140 A1 | 12/2010 | McCune |
| 2011/0123326 A1 | 5/2011 | DiBenedetto et al. |
| 2012/0272762 A1 | 11/2012 | Sheridan |
| 2012/0277055 A1 | 11/2012 | Sheridan |
| 2013/0014490 A1 | 1/2013 | Suciu et al. |
| 2013/0051984 A1 | 2/2013 | McCune et al. |
| 2013/0053202 A1 | 2/2013 | Ghanime et al. |
| 2013/0125561 A1 | 5/2013 | Schwarz et al. |
| 2013/0192264 A1 | 8/2013 | McCune et al. |
| 2013/0319006 A1 | 12/2013 | Pamin et al. |

OTHER PUBLICATIONS

International Preliminary Report on Patentability for International Application No. PCT/US2014/051830 dated Mar. 3, 2016.
Sunston, B. (Ed.), Jane's Aero-Engines, Issue seven, Jane's Information Group Limited, 2000, pp. 510-512, Coulsdon, Surrey, UK.
Rauch, Dale, Design Study of an Air Pump and Integral Lift Engine ALF-504 Using the Lycoming 502 Core, National Aeronautics and Space Administration, NASA CR-120,992, Jul. 1972, pp. 1-171.
European Search Report for EP Application No. 14860693.2 dated Aug. 1, 2017.

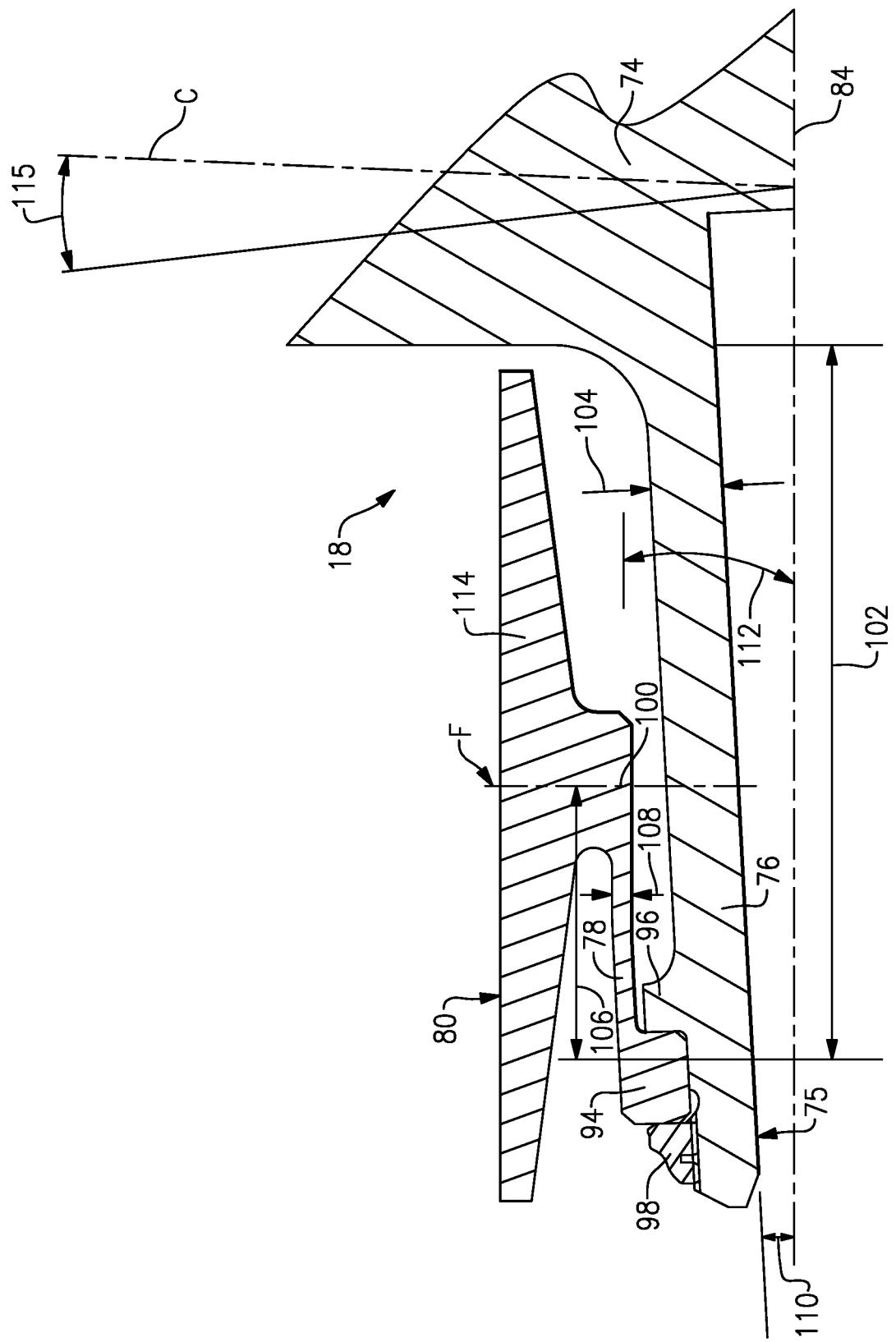

LOAD BALANCED JOURNAL BEARING PIN

CROSS REFERENCE TO RELATED APPLICATION

This application is a continuation in part of U.S. application Ser. No. 14/307,587 filed on Jun. 18, 2014, which claims priority to U.S. Provisional Application No. 61/868,120 filed on Aug. 21, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The epicyclical gear assembly includes bearings that support rotation of gears. Loads incurred during operation can disrupt a desired relative alignment between gears and therefore the gear assembly may be supported on structures designed to accommodate such loads. However, the bearings themselves may not accommodate such loads and contribute to misalignment of meshing gears.

Although geared architectures improve propulsive efficiency, they present different challenges that can reduce any efficiency gains. Accordingly, turbine engine manufacturers continue to seek further improvements to engine performance including improvements to thermal, transfer and propulsive efficiencies.

SUMMARY

A fan drive gear system according to an exemplary embodiment of this disclosure, among other possible things includes a sun gear rotatable about an axis of rotation. A plurality of intermediate gears is rotatable about an intermediate gear rotation axis in meshing engagement with the sun gear. A ring gear circumscribes the intermediate gears. A bearing assembly supports at least one of the plurality of intermediate gears. The bearing assembly includes a first beam extending in a first direction and a second beam extending from an end of the first beam in a second direction. A bearing surface is supported on the second beam. The first and second beams are configured to maintain the bearing surface substantially parallel to the intermediate gear rotation axis during operation.

In a further embodiment of any of the foregoing fan drive gear systems, both the first beam and the second beam include an approximately common stiffness and bend in opposite directions to maintain the bearing surface substantially parallel to the intermediate gear rotation axis under a load applied to the bearing surface.

In a further embodiment of any of the foregoing fan drive gear systems, the first beam includes a first thickness in cross-section that combined with a first length provides a first stiffness.

In a further embodiment of any of the foregoing fan drive gear systems, the second beam includes a second thickness in cross-section that combined with a second length provides a second stiffness approximately equal to the first stiffness.

In a further embodiment of any of the foregoing fan drive gear systems, the first beam includes a portion of a support structure.

In a further embodiment of any of the foregoing fan drive gear systems, the support structure includes a torque frame.

In a further embodiment of any of the foregoing fan drive gear systems, the second beam extends from the end of the first beam to a midway point of the bearing surface.

In a further embodiment of any of the foregoing fan drive gear systems, includes a passage for lubricant through the bearing surface and a lubricant conduit for communicating lubricant from the first beam to the passage in the bearing surface.

In a further embodiment of any of the foregoing fan drive gear systems, includes a first opening within the first beam receiving a first end of THE lubricant conduit and a second opening in the second beam proximate the lubricant passage for receiving a second end of the lubricant conduit.

In a further embodiment of any of the foregoing fan drive gear systems, the lubricant conduit is flexible to enable relative bending of the first beam relative to the second beam.

A turbofan engine according to an exemplary embodiment of this disclosure, among other possible things includes a fan including a plurality of fan blades rotatable about an axis, a compressor section, a combustor in fluid communication with the compressor section, a turbine section in fluid communication with the combustor, and a fan drive gear system driven by the turbine section. The fan drive gear system includes a sun gear rotatable about an axis of rotation. A plurality of intermediate gears are each rotatable about an intermediate gear rotation axis and in meshing engagement with the sun gear. A ring gear circumscribes the intermediate gears. A bearing assembly supports at least one of the plurality of intermediate gears. The bearing assembly includes a first beam extending in a first direction and a second beam extending from an end of the first beam in a second direction. A bearing surface is supported on the second beam. The first and second beams are configured to maintain the bearing surface substantially parallel to the intermediate gear rotation axis during operation.

In a further embodiment of any of the foregoing turbofan engines, both the first beam and the second beam include an approximately common stiffness and bend in opposite directions to maintain the bearing surface substantially parallel to the intermediate gear rotation axis under a load applied to the bearing surface.

In a further embodiment of any of the foregoing turbofan engines, the first beam includes a first thickness in cross-section that combined with a first length provides a first stiffness and the second beam includes a second thickness in cross-section that combined with a second length provides a second stiffness approximately equal to the first stiffness.

In a further embodiment of any of the foregoing turbofan engines, the second beam extends from the end of the first beam to a midway point of the bearing surface.

In a further embodiment of any of the foregoing turbofan engines, the first beam includes a portion of a support structure.

In a further embodiment of any of the foregoing turbofan engines, includes a passage for lubricant through the bearing surface and a lubricant conduit for communicating lubricant from the first beam to the passage in the bearing surface.

In a further embodiment of any of the foregoing turbofan engines, the fan drive gear system provides a speed reduction between the turbine section and the fan section of greater than about 2.3.

In a further embodiment of any of the foregoing turbofan engines, the turbofan engine is a high bypass geared aircraft engine having a bypass ratio of greater than about ten (10).

In a further embodiment of any of the foregoing turbofan engines, the turbofan engine includes a Fan Pressure Ratio of less than about 1.45.

In a further embodiment of any of the foregoing turbofan engines, the turbine section includes a fan drive turbine coupled to drive the fan through the fan drive gear system and a second turbine forward of the fan drive turbine and a ratio of a number of fan blades in the fan and a number of rotors in the fan drive turbine is between about 3.3 and about 8.6.

A method of designing a fan drive gear system according to an exemplary embodiment of this disclosure, among other possible things includes defining features of a sun gear configurable for rotation about an axis of rotation, defining a plurality of intermediate gears configured for rotation about an intermediate gear rotation axis to be in meshing engagement with the sun gear, and configuring a bearing assembly to support at least one of the plurality of intermediate gears. The bearing assembly is further configured to include a first beam that extends in a first direction and a second beam that extends from an end of the first beam in a second direction. A bearing surface is supported on the second beam and configuring the first and second beams to maintain the bearing surface substantially parallel to the intermediate gear rotation axis during operation.

In a further embodiment of any of the foregoing methods, includes configuring both the first beam and the second beam to include an approximately common stiffness and to bend in opposite directions for maintaining the bearing surface substantially parallel to the intermediate gear rotation axis under a load applied to the bearing surface.

In a further embodiment of any of the foregoing methods, configuring the first beam includes defining a first thickness in cross-section that combined with a first length provides a first stiffness.

In a further embodiment of any of the foregoing methods, configuring the second beam includes defining a second thickness in cross-section that combined with a second length provides a second stiffness approximately equal to the first stiffness.

In a further embodiment of any of the foregoing methods, includes defining a passage for lubricant through the bearing surface and defining a lubricant conduit for communicating lubricant from the first beam to the passage in the bearing surface.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a cross-sectional view of a portion of the example journal bearing.

DETAILED DESCRIPTION

Figure 1:
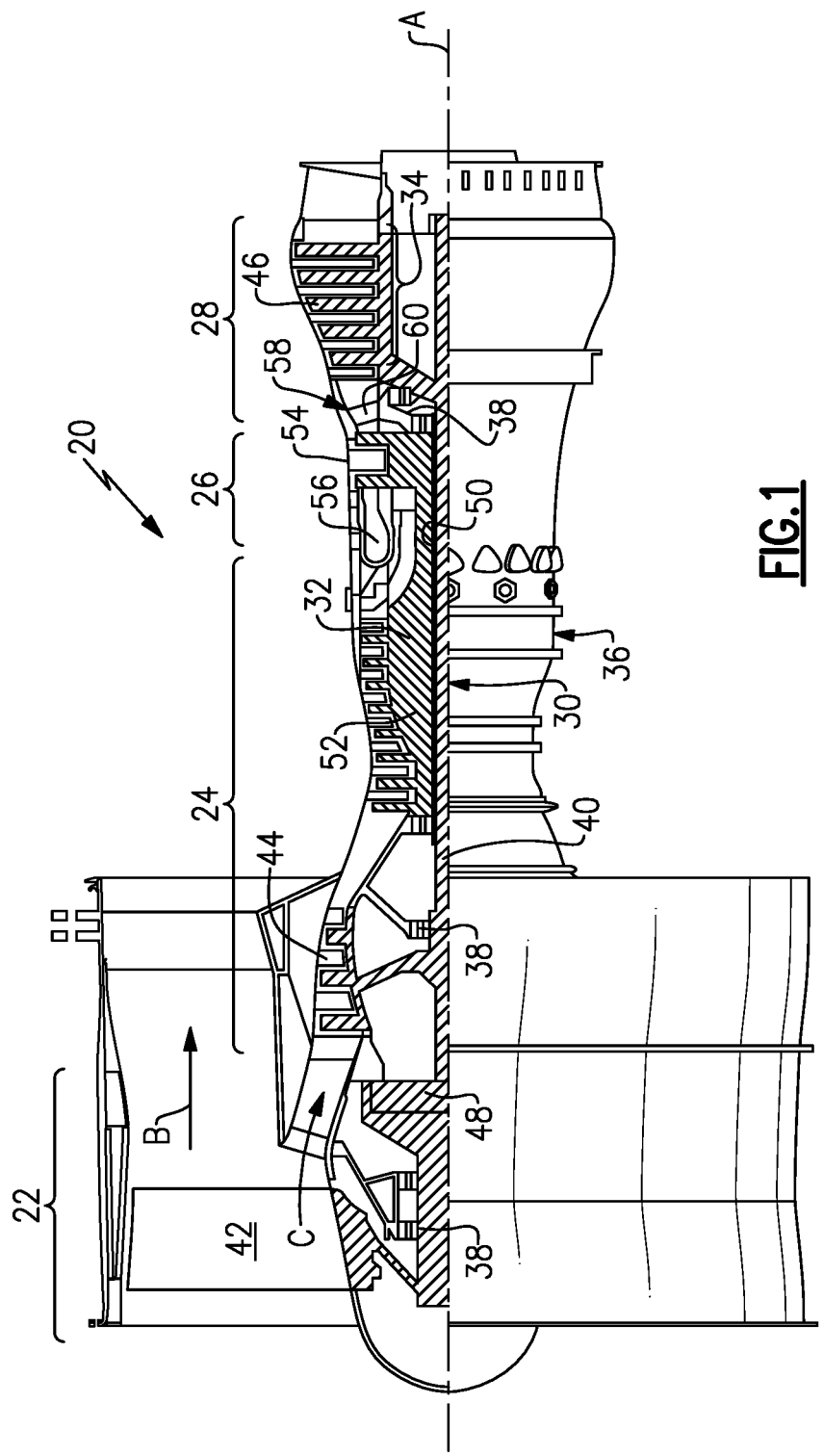
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a first (e.g., a low pressure) compressor section 44 to a first (e.g., a low pressure) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a second (e.g., a high pressure) compressor section 52 and a second (e.g., a high pressure) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft. (10.67 km), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
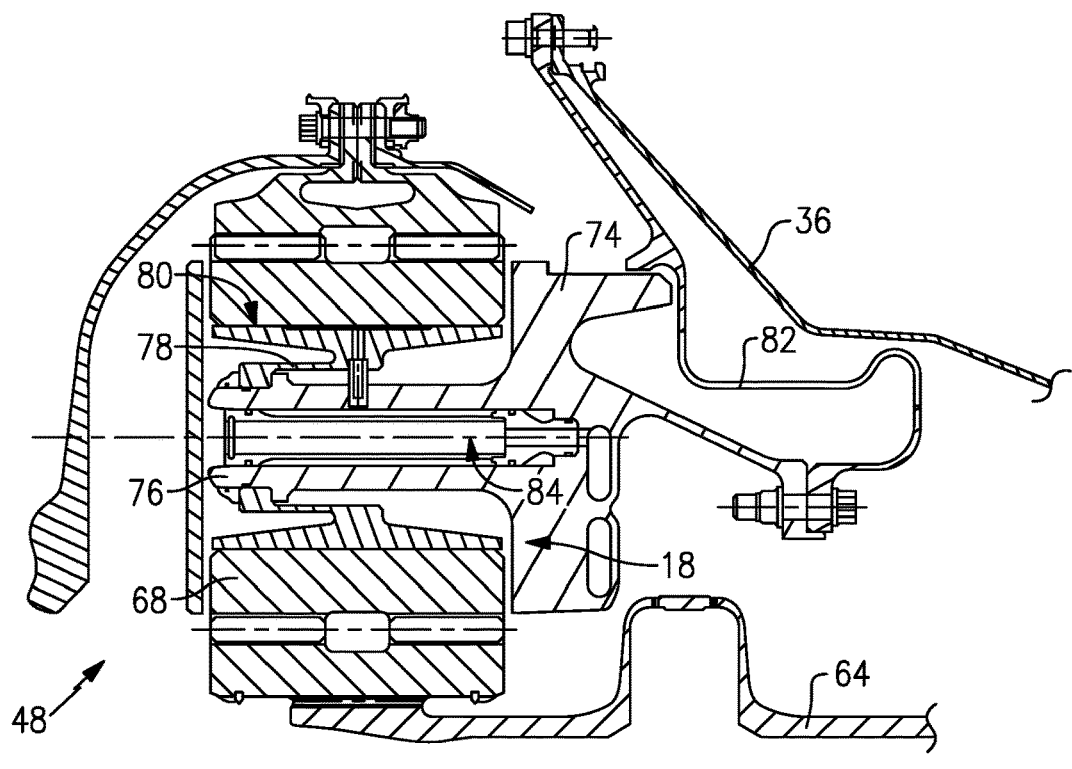
FIG. 2 is a sectional view of an example fan drive gear system.
Figure 2:
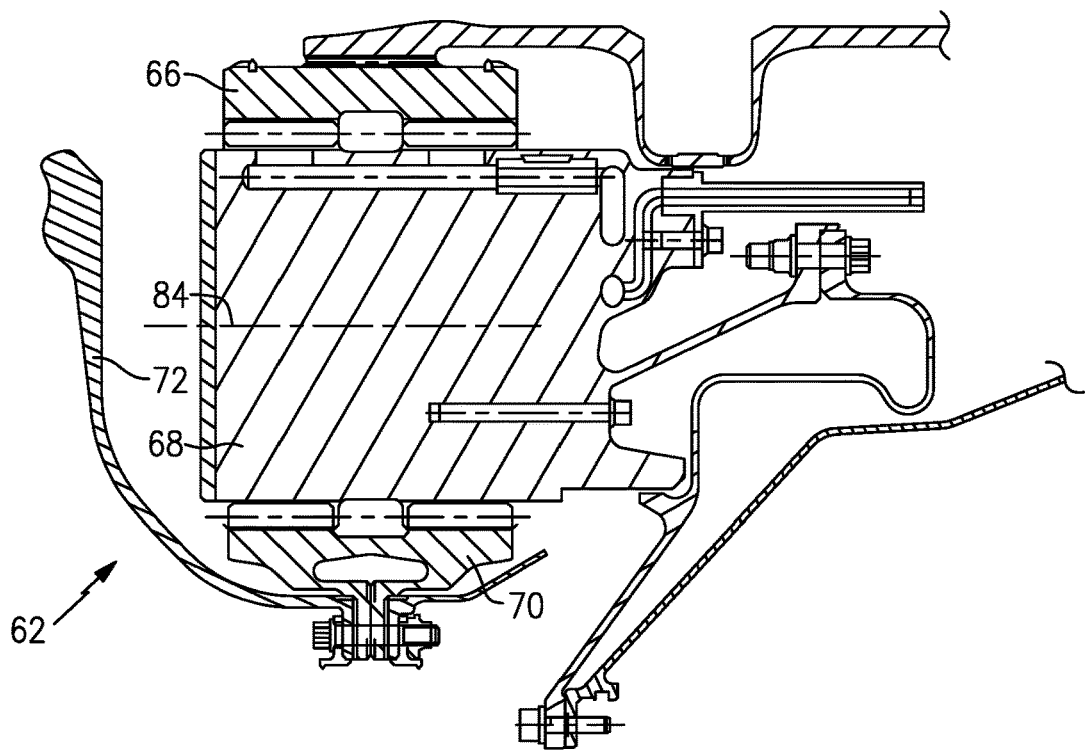
Figure 3:
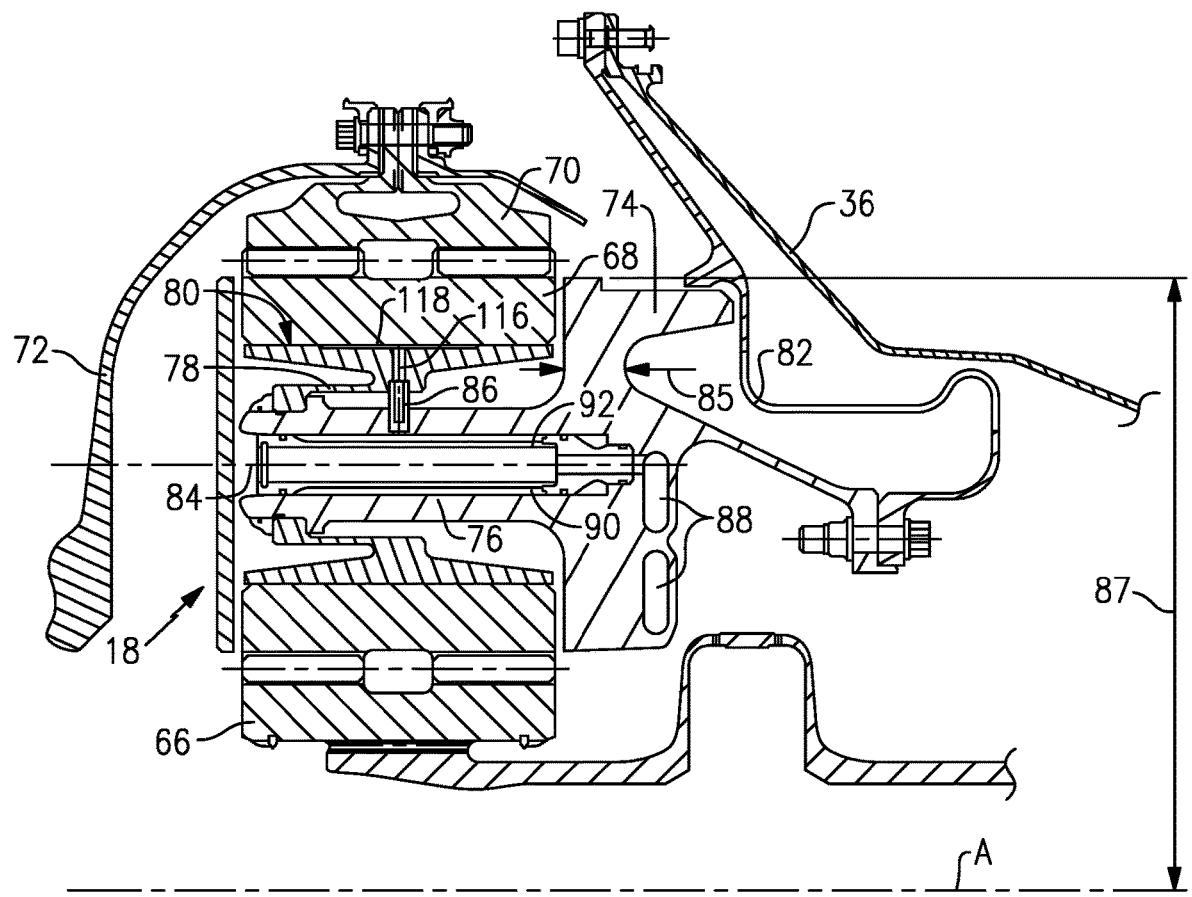
FIG. 3 is an enlarged sectional view of an example journal bearing.

Referring to FIGS. 2, 3 and 4, the example fan drive gear system 62 is supported by a torque frame carrier 74 that is attached to a flex support 82. The flex support 82 is, in turn, attached to a fixed static structure 36 of the engine 20. The fan drive gear system 62 includes the geared architecture 48. The geared architecture 48 includes a sun gear 66 that is driven by an input shaft 64. The sun gear 66 drives a plurality of intermediate gears 68 that are disposed about the sun gear 66. The intermediate gears 68, in turn, drive a ring gear 70 that circumscribes all of the intermediate gears 68. The ring gear 70 is, in turn, attached to a fan drive shaft 72 to drive the fan 42.

As appreciated, although a single intermediate gear assembly is shown and described by way of example, the example fan drive gear system includes a plurality of intermediate gears disposed about the sun gear.

The example geared architecture 48 includes a load balanced journal bearing assembly 18 that maintains alignment of the bearing surface 80 relative to a rotation axis 84 of each of the intermediate gears 68. As appreciated, the intermediate gear 68 can be referred to as star gears or planet gears depending on the configuration of the geared architecture.

Each of the intermediate gears 68 is supported for rotation about their corresponding rotation axis 84 by a bearing surface 80 of the journal bearing assembly 18.

The example journal bearing assembly 18 includes a first beam 76, or first extension arm that extends outward from the torque frame carrier 74. The first beam 76 is cylindrical and includes a first end 75 spaced apart from the torque frame 74 a first length 102. The first end 75 includes features that support a journal bearing 114. The journal bearing 114 is supported on a second beam 78 that extends from the first end 75 towards a mid-point 100 of the intermediate gear 68.

The first beam 76 supports a second beam 78 or second extension arm that, in turn, supports the journal bearing 114 that supports rotation of the corresponding intermediate gear 68. The second beam 78 is cylindrical and extends in a second direction that is opposite the first direction and the first beam 76. Both the first beam 76 and the second beam 78 are flexible and include an approximately equal stiffness. Lubrication is provided from torque frame 74 through lubrication passages 88. Moreover, the torque frame 74 is also flexible and includes a stiffness related to the thickness 85 and diameter 87. The approximate equal stiffness provided by the torque frame 74, first beam 76 and second beam vary within approximately 10% of each other as may be encountered due to material, assembly and dimensional tolerance ranges.

The torque frame 74 defines a lubrication passage 88 that communicates lubricant to a cavity 90 disposed within the first beam 76. The first beam 76 is a cylindrical structure that extends from the torque frame carrier 74. The first beam 76 further defines the cavity 90 that includes a jump tube 92. The jump tube 92 provides for communication of lubricant to a central portion of the cavity 92. A flexible lubrication conduit 86 extends from the first beam 76 to the second beam 78 and is in communication with a lubrication passage 116 that supplies lubricant to the bearing surface 80.

The lubrication conduit 86 is flexible to accommodate movement between the second beam 78 and the first beam 76. As appreciated, the second beam 78 will bend and move relative to the first beam 76 such that the bearing surface 80 will remain in a parallel orientation relative to the gear axis of rotation 84. On each end of the lubrication conduit 86 are seals that engage interior surfaces of passages disposed and defined within corresponding first and second beam 76 and 78. During operation, the lubrication tube 86 is biased outwardly into the second beam 78 by pressure provided by the lubricant flow. The bearing surface 80 includes a lubricant surface 118 that allows lubricant to spread about the contact surface between the intermediate gear 68 and the bearing surface 80.

Referring to FIG. 4 with continued reference to FIG. 3, centerline F of the example journal bearing 114 is substantially perpendicular to the gear axis of rotation 84 and parallel to a centerline C of the torque frame 74 in an unloaded and un-deflected condition. The example journal bearing 114 includes the bearing surface 80 that is maintained in a parallel orientation relative to the gear axis of rotation 84 (FIG. 3) even under a force applied to the bearing surface 80. In the event that a force is applied to the bearing surface 80, the first beam 76 will bend in a first direction at a first angle 110 and the second beam 78 will bend in a second direction opposite the first direction at an angle 112. Torque frame 74 is also flexible and will bend in a third direction at a third angle 115, in the same direction as angle 110. The summation of angles 112 minus angles 110 and 115, combine to maintain the bearing surface 80 at an orientation that is parallel to the gear axis of rotation. The corresponding angular deflections of the first beam 76, second beam 78 and torque frame 74 include a related stiffness.

The first stiffness is provided by a first length 102 and a first thickness 104 for the first beam 76. The second stiffness of the second beam 78 is provided by a second length 106 combined with a second thickness 108. The torque frame 74 includes a third stiffness related to the thickness 85 and the diameter 87 shown in FIG. 3. A second length 106 extends from a boss portion 94 connected to the first beam 76 to a midway portion 100 of the bearing surface 80. The corresponding first thickness 104, first length 102, second length 106 and second thickness 108 coupled with the thickness 85 and diameter 87 of the torque frame 74 correspond to provide a stiffness of the first beam 76, the second beam 78 and the torque frame 74 that enables centerlines C and F to remain substantially parallel when a load is applied to the bearing surface 80. In this example, substantially parallel would include angles of the centerlines C and F that are within +/−10° of each other.

The generally equal and opposite deflections provided by the summation of the stiffness of the first beam 76, the second beam 78 and the torque frame 74 accommodate loads that are placed on the intermediate gears 68, but maintains the journal bearing surface 80 in a desired parallel orientation with the gear axis of rotation 84. In this example, the first stiffness, second stiffness and third stiffness are related and/or approximately equal, where related and approximately equal according to one embodiment of this disclosure, includes a stiffness that varies within a range of 10% of each other.

In this example, the journal bearing 114 is an integral part with the second beam 78. The journal bearing 114 is assembled to the first beam 76 at a first end 75. The first end 75 includes a notch 96 that provides a stop or position of the second beam 78. The second beam 78 includes the boss portion 94 that abuts against the notch 96 of the first beam 76. A spanner nut 98 is threaded onto the first end 75 of the first beam 76 to maintain a position of the second beam 78 and journal bearing 114 relative to the first beam 76.

Accordingly, the example journal bearing assembly maintains the bearing surface 80 in a substantially parallel orientation with respect to the axis of rotation of the intermediate gears in an unloaded or loaded condition by use of the approximately equal and oppositely orientated flexible beam 76 and 78.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system comprising:
    a sun gear rotatable about an axis of rotation;
    a plurality of intermediate gears rotatable about an intermediate gear rotation axis in meshing engagement with the sun gear;
    a ring gear circumscribing the intermediate gears;
    a bearing assembly supporting at least one of the plurality of intermediate gears, the bearing assembly including a first beam extending in a first direction and a second beam extending from an end of the first beam in a second direction, and a journal bearing supported on the second beam, wherein the first and second beams are configured to maintain the journal bearing substantially parallel to the intermediate gear rotation axis during operation; and
    a torque frame including the first beam, wherein the first beam, the second beam and the torque frame include a stiffness and bend to maintain the journal bearing substantially parallel to the intermediate gear rotation axis under an applied load.

2. The fan drive gear system as recited in claim 1, wherein the first beam, second beam and the torque frame include a stiffness within 10% of each other.

3. The fan drive gear system as recited in claim 2, wherein the first beam includes a first thickness in cross-section that combined with a first length provides a first stiffness.

4. The fan drive gear system as recited in claim 3, wherein the second beam includes a second thickness in cross-section that combined with a second length provides a second stiffness.

5. The fan drive gear system as recited in claim 4, wherein the torque frame includes a third thickness in cross-section combined with a diameter from the axis of rotation of the sun gear provides a third stiffness.

6. The fan drive gear system as recited in claim 5, wherein the first beam extends from the torque frame in the first direction away from the third thickness.

7. The fan drive gear system as recited in claim 1, wherein the second beam extends from the end of the first beam to a midway point of the journal bearing.

8. The fan drive gear system as recited in claim 1, including a passage for lubricant through the journal bearing and a lubricant conduit for communicating lubricant from the first beam to the passage in the journal bearing.

9. The fan drive gear system as recited in claim 8, including a first opening within the first beam receiving a first end of the lubricant conduit and a second opening in the second beam proximate the lubricant passage for receiving a second end of the lubricant conduit.

10. The fan drive gear system as recited in claim 9, wherein the lubricant conduit is flexible to enable relative bending of the first beam relative to the second beam.

11. A turbofan engine comprising:
a fan including a plurality of fan blades rotatable about an axis;
a compressor section;
a combustor in fluid communication with the compressor section;
a turbine section in fluid communication with the combustor; and
a fan drive gear system driven by the turbine section, the fan drive gear system including a sun gear rotatable about an axis of rotation;
a plurality of intermediate gears each rotatable about an intermediate gear rotation axis and in meshing engagement with the sun gear;
a ring gear circumscribing the intermediate gears, and a bearing assembly supporting at least one of the plurality of intermediate gears, wherein the bearing assembly includes a first beam extending in a first direction from a torque frame and a second beam extending from an end of the first beam in a second direction, and a journal bearing supported on the second beam, wherein the first beam, the second beam and the torque frame bend to maintain the journal bearing substantially parallel to the intermediate gear rotation axis during operation.

12. The turbofan engine as recited in claim 11, wherein both the first beam, the second beam and the torque frame include a stiffness within 10% of each other.

13. The turbofan engine as recited in claim 12, wherein the first beam includes a first thickness in cross-section that combined with a first length provides a first stiffness, the second beam includes a second thickness in cross-section that combined with a second length provides a second stiffness and the torque frame includes a third thickness combined with a diameter from the axis that provides a third stiffness.

14. The turbofan engine as recited in claim 13, wherein the second beam extends from the end of the first beam to a midway point of the journal bearing.

15. The turbofan engine as recited in claim 14, wherein a centerline of the journal bearing and a centerline of the torque frame remain substantially parallel to maintain the journal bearing substantially parallel to the intermediate gear rotation axis.

16. The turbofan engine as recited in claim 11, including a passage for lubricant through the journal bearing and a lubricant conduit for communicating lubricant from the first beam to the passage in the journal bearing.

17. The turbofan engine as recited in claim 16, wherein the fan drive gear system provides a speed reduction between the turbine section and the fan section of greater than 2.3.

18. The turbofan engine as recited in claim 17, wherein the turbofan engine is a high bypass geared aircraft engine having a bypass ratio of greater than ten (10).

19. The turbofan engine as recited in claim 18, wherein the turbofan engine includes a Fan Pressure Ratio of less than 1.45.

20. The turbofan engine as recited in claim 19, wherein the turbine section includes a fan drive turbine coupled to drive the fan through the fan drive gear system and a second turbine forward of the fan drive turbine and a ratio of a number of fan blades in the fan and a number of rotors in the fan drive turbine is between 3.3 and 8.6.

* * * * *